US 11,283,486 B1

(12) United States Patent
McKnight et al.

(10) Patent No.: US 11,283,486 B1
(45) Date of Patent: Mar. 22, 2022

(54) MECHANICALLY ACTUATED MAGNETOSTRICTIVE TRANSMITTER

(71) Applicant: HRL Laboratories, LLC, Malibu, CA (US)

(72) Inventors: Geoffrey P. McKnight, Los Angeles, CA (US); Walter S. Wall, Los Angeles, CA (US); Skyler Selvin, San Jose, CA (US); Casey J. Sennott, Calabasas, CA (US); David W. Shahan, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 418 days.

(21) Appl. No.: 16/393,852

(22) Filed: Apr. 24, 2019

Related U.S. Application Data

(60) Provisional application No. 62/689,759, filed on Jun. 25, 2018.

(51) Int. Cl.
| | | |
|---|---|---|
| *H01Q 21/06* | (2006.01) | |
| *H01Q 3/44* | (2006.01) | |
| *H01Q 11/02* | (2006.01) | |
| *H03H 9/25* | (2006.01) | |
| *H04B 5/00* | (2006.01) | |

(52) U.S. Cl.
CPC .................. *H04B 5/0075* (2013.01)

(58) Field of Classification Search
None
See application file for complete search history.

(56) References Cited

U.S. PATENT DOCUMENTS

| | | | | |
|---|---|---|---|---|
| 4,530,489 A | 7/1985 | Hirano | | |
| 5,712,566 A | 1/1998 | Taicher | | |
| 5,854,589 A | * 12/1998 | How | ................ | G08B 13/2417 340/551 |
| 6,130,612 A | 10/2000 | Castellano | | |
| 6,273,965 B1 | 8/2001 | Pulvirenti | | |
| 6,645,314 B1 | * 11/2003 | Herzer | ................ | C22C 1/002 148/108 |
| 7,088,247 B2 | * 8/2006 | Herzer | ................ | G08B 13/2408 340/572.6 |
| 7,123,129 B1 | * 10/2006 | Schrott | ................ | G06K 19/0723 340/10.1 |
| 7,126,797 B2 | * 10/2006 | Hasegawa | ................ | H01F 10/3272 360/324.1 |
| 7,471,082 B2 | * 12/2008 | Grimm | ................ | G01R 33/18 324/232 |
| 7,851,971 B2 | 12/2010 | Chang | | |

(Continued)

OTHER PUBLICATIONS

From U.S. Appl. No. 16/393,830 (unpublished, non-publication request filed), Office Action dated Apr. 29, 2021.

(Continued)

*Primary Examiner* — Tuan A Tran
(74) *Attorney, Agent, or Firm* — Ladas & Parry

(57) ABSTRACT

A mechanically actuated transmitter is disclosed. The transmitter can comprise a magnetoelastic member; a magnet adjacent to the magnetoelastic member for inducing magnetization in the magnetoelastic member; a mechanical driver for applying mechanical stress to the magnetoelastic material, thereby changing the magnetic permeability of the magnetoelastic material to change an external magnetic field.

36 Claims, 14 Drawing Sheets

(56) References Cited

U.S. PATENT DOCUMENTS

| | | | |
|---|---|---|---|
| 9,396,428 B2* | 7/2016 | Brar | G06K 19/07758 |
| 9,551,691 B2* | 1/2017 | Daikoku | G01N 29/2412 |
| 9,660,349 B2* | 5/2017 | Keller | G01R 33/098 |
| 10,132,699 B1* | 11/2018 | Pillars | C25D 5/022 |
| 10,215,648 B1 | 2/2019 | Pillars | C25D 3/562 |
| 10,218,072 B2* | 2/2019 | Wang | H01Q 7/06 |
| 10,260,969 B1* | 4/2019 | Pillars | G01L 1/106 |
| 10,490,887 B2* | 11/2019 | Schlatter | H05K 1/115 |
| 10,510,945 B1* | 12/2019 | Langlois | C25D 5/627 |
| 10,557,898 B2* | 2/2020 | Gianchandani | G01R 33/063 |
| 10,601,400 B1* | 3/2020 | McConney | H03H 9/22 |
| 10,763,823 B2* | 9/2020 | Shoemaker | G08B 13/2408 |
| 2007/0188397 A1 | 8/2007 | Parsche | |
| 2010/0277387 A1 | 11/2010 | Schantz | |
| 2014/0217932 A1 | 8/2014 | Bright | |
| 2015/0318624 A1 | 11/2015 | Schantz | |
| 2016/0294056 A1 | 10/2016 | Manteghi | |
| 2017/0040674 A1 | 2/2017 | Suh | |
| 2017/0279471 A1 | 9/2017 | Manteghi | |
| 2017/0299757 A1 | 10/2017 | Bench | |
| 2018/0129338 A1 | 5/2018 | Ihalainen | |
| 2020/0034583 A1 | 1/2020 | Nikitin | |
| 2021/0242606 A1* | 8/2021 | Sepulveda | H01Q 9/0407 |

OTHER PUBLICATIONS

From U.S. Appl. No. 16/393,816 (unpublished, non-publication request filed), Office Action dated Sep. 1, 2020.
U.S. Appl. No. 16/393,816, Selvin, filed Apr. 24, 2019.
U.S. Appl. No. 16/393,830, Wall, filed Apr. 24, 2019.
U.S. Appl. No. 16/011,964, McKnight, filed Jun. 19, 2018.
Azad, U., "Direct Antenna Modulation (DAM) for Enhanced Capacity Performance of Near-Field Communication (NFC) Link", IEEE Transactions on Circuits and Systems I: Regular Papers, vol. 61, No. 3, Mar. 2014, pp. 902-010.
Babakhani, et al., "Transmitter Architectures Based on Near-Field Direct Antenna Modulation", IEEE Journal of Solid-State Circuits, pp. 2674-2692, vol. 43, No. 12, Dec. 2008.
Bickford et al., "Performance of Electrically Small Conventional and Mechanical Antennas", IEEE Transactions on Antennas and Propagation, vol. 67, No. 4, Apr. 2019, pp. 2209-2223.
Hansen, R.C., "Small Antenna Handbook", John Wiley and Sons, Inc. 2011, Chapter 3, pp. 59-133.
Keller, S.D., et al., "Direct antenna modulation: analysis, design, and experiment", 2006 IEEE Antennas and Propagation Society International Symposium, Jul. 9-14, 2006, pp. 909-912.
Manteghi, M. "An electrically small antenna concept design for transmitting a baseband signal," 2017 IEEE International Symposium on Antennas and Propagation & USNC/URSI National Radio Science Meeting, Jul. 9-14, 2017, pp. 1481-1482.
Xu, et al., "A direct antenna modulation (DAM) transmitter with a switched electrically small antenna," 2010 International Workshop on Antenna Technology (iWAT), Mar. 1-3, 2010 (4 pages).
Yao, et al. "Direct antenna modulation—a promise for ultra-wideband (UWB) transmitting", 2004 IEEE MTT-S International Microwave Symposium Digest, Jun. 6-11, 2004, pp. 1273-1276.
From U.S. Appl. No. 16/393,816 (unpublished, non-publication request filed), Office Action dated Mar. 16, 2021.

* cited by examiner

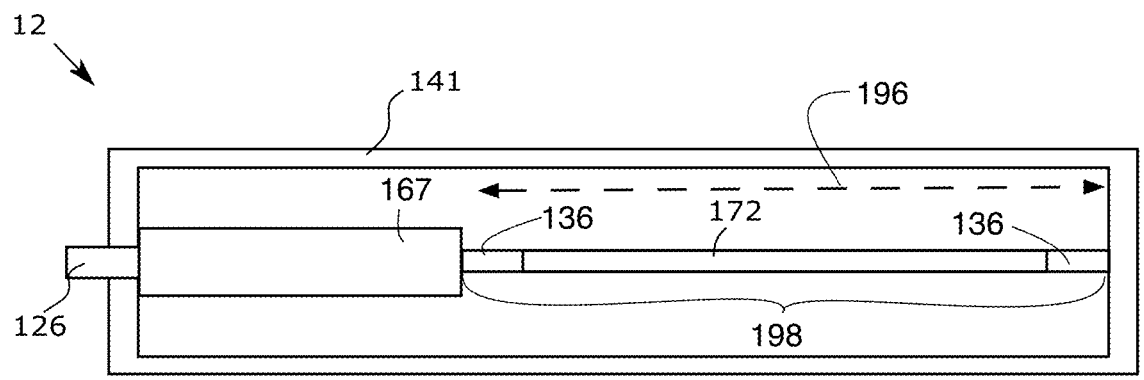
FIG. 1
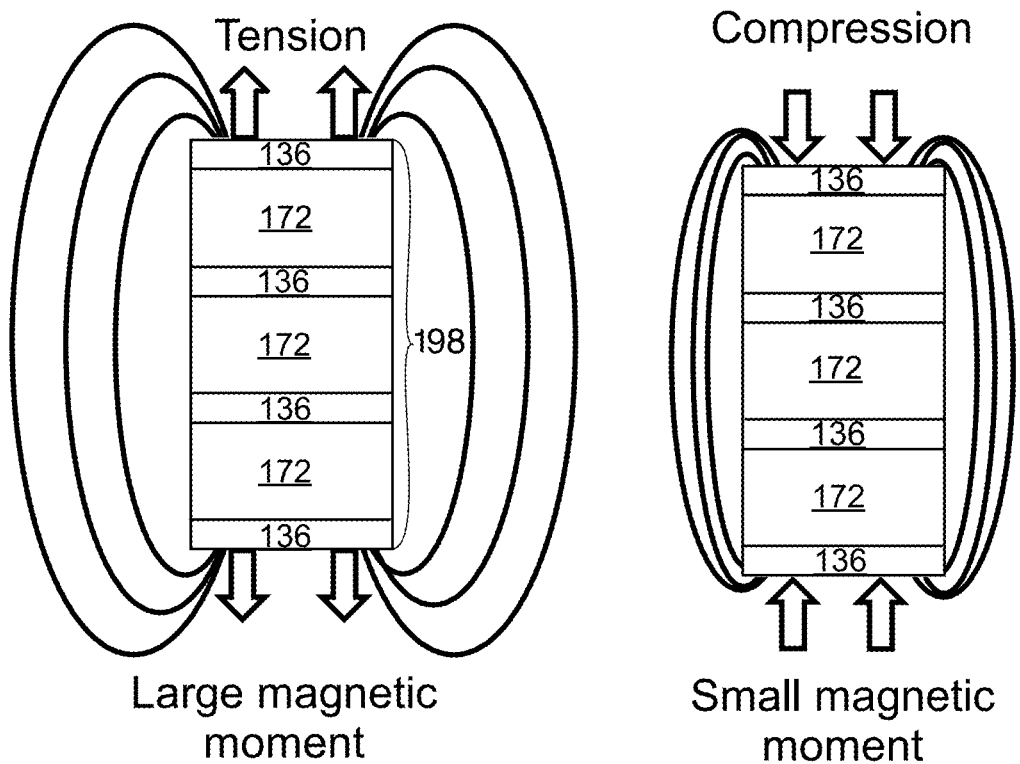
FIG. 1A  FIG. 1B

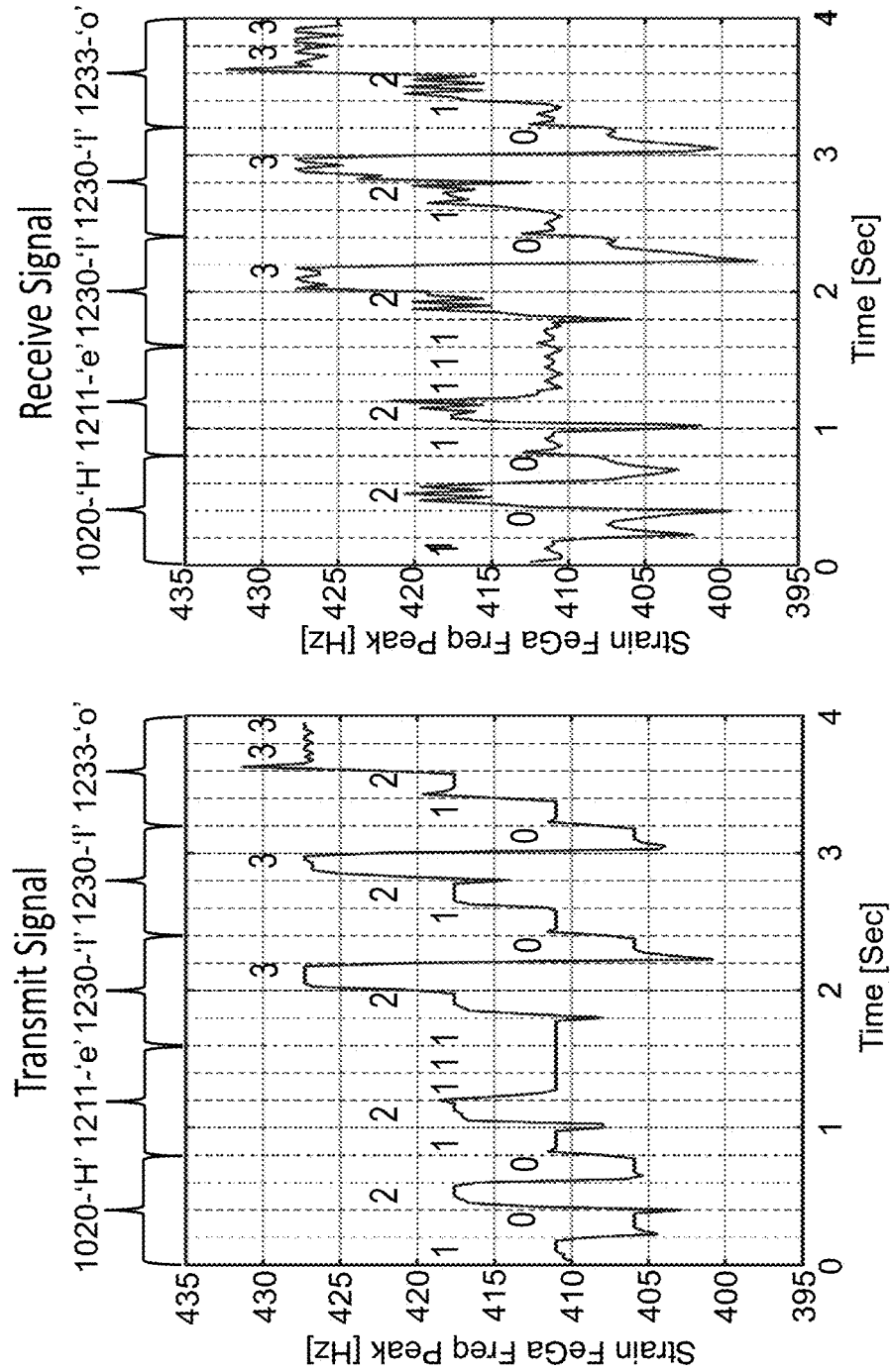

MECHANICALLY ACTUATED MAGNETOSTRICTIVE TRANSMITTER

CROSS REFERENCE TO RELATED APPLICATIONS

This non-provisional application claims the benefit of U.S. Provisional Patent Application No. 62/689,759 filed on Jun. 25, 2018, which is incorporated herein by reference.

This non-provisional application is related U.S. patent application Ser. No. 16/011,964 filed on Jun. 19, 2018 which claims the benefit of U.S. Provisional Patent Application No. 62/522,519 filed on Jun. 20, 2017, which are incorporated herein by reference.

This application is also related to U.S. patent application Ser. No. 16/393,816 filed on the same day as this application and which claims the benefit of U.S. Provisional Patent Application No. 62/689,758 filed 25 Jun. 2018 and entitled "A Mechanically Modulated Loopstick Antenna", the disclosure of which is hereby incorporated herein by reference.

This application is also related to U.S. patent application Ser. No. 16/393,830 filed on the same day as this application and which claims the benefit of U.S. Provisional Patent Application Ser. No. 62/689,755 filed 25 Jun. 2018 and entitled "A Mechanically Actuated and Shunted Magnetostrictive Dipole Transmitter", the disclosures of which are also hereby incorporated herein by reference.

NOTICE OF GOVERNMENT FUNDING

This invention was made with government support under contract HR0011-17-C-0117 awarded by the Defense Advanced Research Projects Agency (DARPA). The government has certain rights in this invention.

TECHNICAL FIELD

The present writing is directed in general to the field of magnetic transmitters and in particular, to the area of mechanically actuated magnetic transmitters. The technology presented can be applicable to programs and systems that utilize actuators and magnetoelastic materials as magnetic transmitting devices or in magnetic transmitting methods.

BACKGROUND

Low frequency (i.e. <100 kHz) electromagnetic waves are difficult to produce with compact and efficient antennas and transmitters. Very low frequency (VLF) (i.e. 3-30 kHz) and ultra low frequency (ULF) (i.e. 0.3-3 kHz) electromagnetic waves become more challenging to produce as the frequency of an antenna is decreased. The difficulty in producing low frequency electromagnetic waves results because the necessary physical size of the antenna (generally a fraction of a single wavelength) becomes impractically large at frequencies below 100 kHz. Antennas for VLF transmitters can be as large as many acres and may require wires suspended hundreds of feet from the ground for efficient operation. A portable field generator with reasonable power consumption does not currently exist. The production of sizeable magnetic fields using loop stick antennas with oscillating current requires significant power due to the resistive losses in the magnetizing coils. Traditional electrically small dipole or patch antennas, less than ½₀th of the wavelength of the electromagnetic wave, are difficult to implement due to the large electrical matching network required. See Bickford et al. "Performance of Electrically Small Conventional and Mechanical Antennas", *IEEE Transactions on Antennas and Propagation*, DOI 10.1109/TAP.2019.2893329.

The technology herein presented is useful primarily to communicate through solid or liquid barriers, such as through underground or underwater pathways or for signal transmission through a biological body. Since low frequency magnetic fields can penetrate conductors, the present technology can potentially extend communications into areas that are currently difficult to reach. Public and private entities may find this technology useful. Other potential applications include those in the oil and gas industry where communications with underground resources such as drilling equipment is currently limited to slow, high-latency acoustic methods or custom expensive drill pipes with inductive coupling.

In U.S. patent application Ser. No. 16/011,964, a concept for modulating the magnetic field of a static permanent magnet or electromagnet was introduced. This concept used a variable reluctance path created by a mechanically actuated magnetostrictive element magnetic flux shield path to alternately capture and release the magnet flux from the permanent magnet. The technology here presented is different in that it comprises an oscillating magnetic field created by varying the permeability between permanent magnets or electromagnets using a series of magnetostrictive elements.

SUMMARY

The present technology comprises a low-frequency, oscillating, magnetic field source based on a stress modulated magnetic dipole. This technology can be used in a transmitter antenna configuration, wherein the amplitude or frequency of a magnetic field emitted by the transmitter antenna is modulated to encode information which is received by a remote magnetic field sensor. The technology comprises a system which combines a single or plurality of magnetic field source(s) (e.g. permanent magnet(s) and/or electromagnet(s)) with a single or plurality of magnetoelastic component(s), wherein the effective permeability of the magnetoelastic component(s) is modified in response to stress (e.g. tension or compression) applied on or to the magnetoelastic component(s). By changing the permeability of the magnetoelastic component(s), the magnetoelastic component(s) affect the dipole moment of the system, causing the dipole moment to oscillate between a first (i.e. small) and a second (i.e. large) value. By operating the magnetoelastic component(s) at mechanical resonance, power consumption is minimized or substantially reduced. To provide a frequency control, an end load actuator is used to apply stress on or to the resonator component(s). In some embodiments disclosed herein, the actuator applies a time-varying, compressive end load on the magnetoelastic component(s) to alter the mechanical dynamics of the system and thus allow for frequency modulation, preferably without signal loss.

In one aspect, the change in the dipole moment of the system is maximized so that the dipole moment oscillates between a minimum value and a maximum value, wherein the minimum value is the total intrinsic moment of the permanent magnets, and wherein the maximum value is the sum of the total intrinsic moment of the permanent magnets and the moment of the magnetoelastic material when the magnetoelastic material is in a magnetic saturation state.

In another aspect, the magnetic field seen outside the transmitter is directly proportional to the dipole moment of the transmitter times a $1/r^3$ factor, where r is a distance from the transmitter.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the technology and methodology herein presented and its potential advantages, reference is now made to the following description taken in conjunction with the accompanying drawings in which common reference numerals are utilized amongst the various embodiments where the reference numerals refer either to identical or nearly identical structure in the various embodiments or to structure which performs identical or very similar functions in the various embodiments. The drawings are not necessarily drawn to scale. Moreover, the patent or application file contains at least one drawing executed in color. Copies of this patent or patent application publication with color drawing(s) will be provided by the Office upon request and payment of the necessary fee."

FIG. 1 illustrates a magnetic transmitter according to one embodiment of this presentation.

FIGS. 1A and 1B depict a variation of the magnetoelastic member where a plurality magnetoelastic members and permanent magnetic members are arranged as an elongate composite beam element.

FIG. 4A illustrates another embodiment of a magnetic transmitter, this embodiment having a free-free (or unfixed-unfixed) bending resonator, while FIG. 4B illustrates the free-free vibratory mode of the embodiment of FIG. 4A.

FIG. 6B graphically illustrates properties of the transmitter illustrated in FIG. 6A during an operation, according to an embodiment of this presentation.

FIG. 6C graphically illustrates particular frequencies of the transmitter illustrated in FIG. 6A during an operation, according to an embodiment of this presentation.

DETAILED DESCRIPTION

Figure 1C:
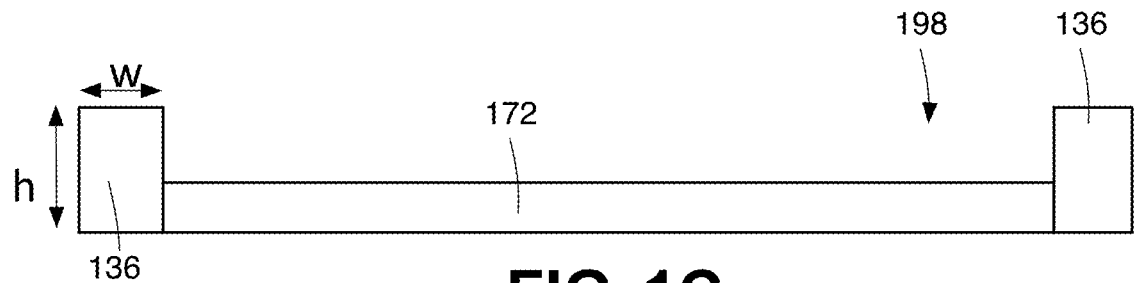
FIGS. 1C-1F illustrate additional possible variations of magnetoelastic member(s) and permanent magnetic members.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

Although example embodiments are here illustrated, the proposed technology may be implemented using any number of techniques, whether currently known or not. The proposed technology should in no way be limited to the example implementations, drawings, and techniques illustrated below.

Magnetoelasticity is the coupling of an internal magnetic moment of a ferromagnetic material to its mechanical strain state. The orientation of the ferromagnetic moment is primarily determined by the interaction of the magnetization with an applied magnetic field, (the energy formed as a result of this interaction is known as the "Zeeman energy"), the magnetocrystalline anisotropy (MCA), and applied stress, or the magnetoelastic coupling. The orientation of the ferromagnetic moment within the material is generally found in a direction that minimizes or reduces the energies associated with the above interactions or properties. In the present technology, the magnetization of the magnetoelastic material is initially oriented along a preferred direction with a magnetic bias field. This magnetic bias field can be static and can be created by passing an electric current through a solenoid. For power and space-constrained applications, the magnetic bias field is preferably created by one or more permanent magnets joined or placed in close proximity to the magnetoelastic material. This provides an initial state in which most ferromagnetic domains of the magnetoelastic material are oriented such that the magnetic moment of the magnetoelastic material is oriented nearly or generally parallel to the magnetic bias field direction.

Stress can be introduced into the magnetoelastic material such that the magnetization state of the magnetoelastic material changes in response to the applied stress. Depending on the type of magnetoelastic material, different changes may occur upon the application of tensile or compressive stress. For some materials, applied tension increases the relative permeability of the material while compression reduces the effective permeability of the material. In one embodiment herein, the applied stress is oriented parallel or generally parallel to the applied magnetic bias field. In this case, an applied tension increases the magnetization of the magnetoelastic material in the direction of the applied magnetic field, while an applied compression decreases the magnetization of the magnetoelastic material. By applying time-varying stress to the magnetoelastic material, the magnetization of the magnetoelastic material can be varied to produce a time-varying magnetic field. The manner in which the magnetic bias field and stress components are introduced or applied to the magnetoelastic material form a basis for several embodiments herein presented. In a preferred embodiment, the technology herein presented can be an information transmitter, wherein transmitting information can comprise varying either the intensity of the applied stress or varying the frequency of the applied stress such that information can be encoded in these variations using standard and/or nonstandard encoding schemes.

FIG. 1 illustrates a magnetic transmitter 12 according to an embodiment of this presentation. Transmitter 12 comprises a magnetoelastic member 172 which is axially oriented and preferably formed in the shape of a high aspect ratio prism or rod or bar. The magnetoelastic member 172 is made of, for example, an alloy of iron and gallium known as galfenol. Other magnetoelastic materials may be substituted for the galfenol. The magnetoelastic member 172 is magnetically biased with one or more permanent magnets 136 (which may be formed in the shape of disks, plates, prisms, rods, bars or otherwise) to define a composite beam element 198 wherein the magnetoelastic member 172 is magnetized along its major axis by the one or more permanent magnets 136. To create a more uniform magnetization state, the magnetoelastic member 172 can comprise two or more magnetoelastic members 172, wherein the two or more magnetoelastic members are interspersed or disposed between the permanent magnets 136 as an elongated member depicted by FIGS. 1A and 1B. The permanent magnets 136 are preferably identically oriented with like magnetic flux directions so that the magnetoelastic member 172 is uniformly magnetized. The strength of the magnets 136, as measured by a $BH_{max}$ product and relative volume in comparison to the magnetoelastic member 172, can be established such that the magnetoelastic member 172 is initially magnetized preferably in its highest permeability state (either in tension or at low compressive stress) such that the magnetoelastic member 172 is preferably in a magnetostriction saturation state. Note that $BH_{max}$ is a standard magnetic materials metric known as an energy density metric where B is the magnetic flux and H is the magnetic field. The permeability of the magnetoelastic member 172 is a function of the stress state of the magnetoelastic member 172. If the magnetoelastic member 172 is in a tension state, its permeability can be relatively high, and the strength of the permanent magnets 136 would be selected so that at this permeability, the magnetization of the magnetoelastic member 172 is preferably equal to its magnetic saturation. Once the stress applied to the magnetoelastic member 172 is reversed and the magnetoelastic member 172 is in a state of compression, its permeability would be lower, and its magnetization would be decreased because the magnetoelastic member 172 would have demagnetized to some extent.

Stress may be applied to the magnetostrictive member 172 using an end actuator 167 to induce modulation of the transmitted magnetic signal. The actuator 167 is preferably a solid state actuator such as a piezoelectric block actuator or a piezoelectric stack actuator driven by a single tone signal to apply FM (or AM or even digital) modulation to the transmitted signal. The actuator 167 is placed in mechanical series with the magnetoelastic member 172 so that the extensional force applied by the actuator 167 applies compressive stress on the magnetoelastic member 172. A containment vessel 141 provides a load return path (for the stress induced buy the end load actuator 167) and preferably surrounds the magnetoelastic member 172, the permanent magnets 136, and the actuator 172. The containment vessel 141 is preferably constructed of materials and dimensioned to sufficient to carry the load exerted by the actuator 167 on the magnetoelastic member 172 (while being braced by the containment vessel 141), and to ensure that a sufficient stress is imparted to the magnetoelastic member 172 by the actuator 167. The containment vessel is preferably a non-ferromagetic material and further is a material with low electrical conductivity to reduce eddy current losses resulting from the magnetic dipole oscillations. An optional preload assembly 126 can be incorporated to provide mechanical bias stress to the assembly of the magnetoelastic member 172, the permanent magnets 136, and the actuator 172 and to aid in the transduction of force from the actuator 167 to the magnetoelastic member 172. In the embodiment of FIG. 1 the optional preload assembly 126 is disposed in series with the actuator 167 and the containment vessel 141 and preferably includes a force adjustment mechanism extending through a wall of the containment vessel 141.

The actuator 167 directly and axially loads the magnetoelastic member 172 and acts to vary the magnetization state thereof to create a changing magnetic field and to encode information by applying an varying single tone signal (with information time-wide encoded thereon) to the actuator 167. In one embodiment, the piezoelectric actuator 167 can be used to directly drive the load on the magnetoelastic member 172 vibrationally, preferably in a non-resonant manner, the longitudinal vibration being represented by dashed line 196. In another embodiment, the force applied to the magnetoelastic member 172 can be applied dynamically so as to excite a longitudinal vibrational mode ("the excited longitudinal vibrational mode") in the aforementioned assembly. Depending on the quality factor (Q) of the resonator, the driving frequency of actuator 167 can be changed or adjusted to vary directly the frequency of the excited longitudinal vibrational mode, thereby creating frequency encoding. The resonant frequency of the transmitter is determined by the length of the axial stack of the aforementioned assembly and further, by the stiffness and density of each component thereof.

The magnetoelastic member 172 preferably has an aspect ratio equal to or greater than 10:1, and in at least one embodiment, the magnetoelastic member 172 is a magnetoelastic rod. As seen in FIG. 1, permanent magnets 136 are located adjacent to opposing ends of the magnetoelastic member 172 to bias the magnetic field state inside the magnetoelastic member 172. Actuator 167 is preferably a piezoelectric device such as stack actuator that can apply a mechanical load to the magnetoelastic member 172 in response to electrical energy (electrical connections to actuator 167 are not should for clarity of presentation. The containment vessel 141 which may surround the actuator 167, magnetoelastic member 172, and permanent magnets 136 provides a tensile load path to counter the compressive stress forces applied to the magnetoelastic member 172 by the actuator 167 so that the composite beam element 198 flexes or bends (vibrates) in response to electrical energy being applied to the actuator 167. The optional preload assembly earlier described which is preferably a mechanical preload adjuster 126, can be included as seen in FIG. 1 extending through the vessel 141 to the actuator 167 which abuts the vessel 141 to establish a mechanical compression bias into the magnetoelastic member(s) 172 in the composite beam element 198. Preferably member 141 is sufficiently stiff so that most of the mechanical vibration imposed by the actuator 167 occurs in the composite beam element 198 as opposed to member 141. Also, member 141 need not necessarily surround magnetostrictive member 172, magnets 136, and the actuator 167 (as in a vessel) but rather may take a form more akin to a C-clamp.

FIGS. 1A-1G illustrate a number of different possible embodiments of the composite beam element 198. FIGS. 1A and 1B have been previously discussed above. FIGS. 1A and 1B illustrate the fact that the composite beam element 198 may comprise, in some embodiments, multiple permanent magnets 136 and multiple magnetoelastic members 172. Preferably if multiple permanent magnets 136 as utilized in a composite beam element 198 they will have a common direction of North-South magnetization along the axis of the composite beam element 198.

Figure 1D:
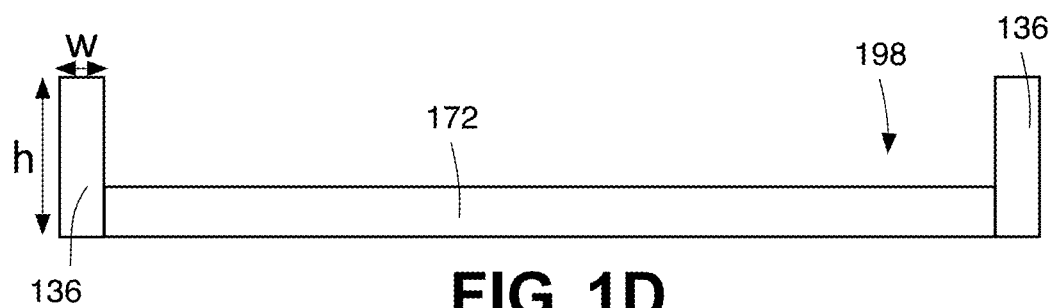

FIGS. 1C and 1D illustrate that the permanent magnets 136 may have differing widths (w) and height (h) as well as depths (not shown) compared to the magnetoelastic member 172 thereby giving different aspect ratios for the magnets 136 compared to the magnetoelastic member(s) 172. The differing aspect ratios (between the permanent magnets 136 and the magnetoelastic member(s) 172) can be useful to improve the flux uniformity inside the magnetoelastic member(s) 172. Finite element modeling can be used to determine optimal aspect ratios for a given magnetoelastic member 172 design.

Figure 1E:
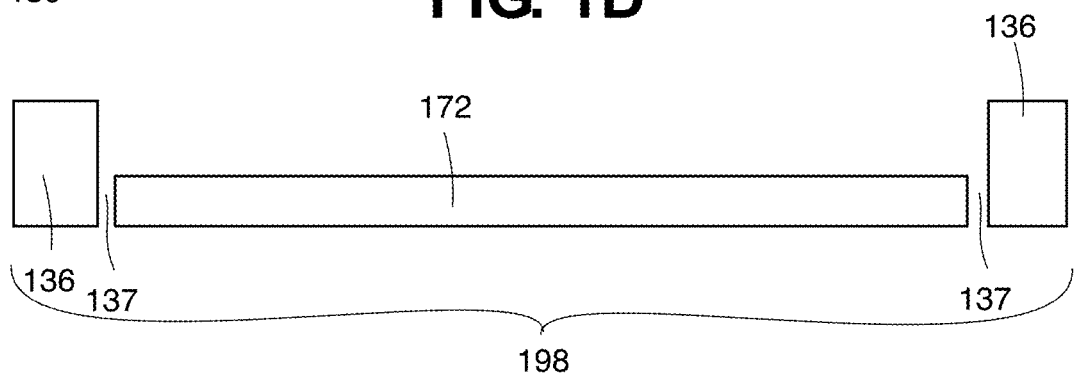
Figure 1F:
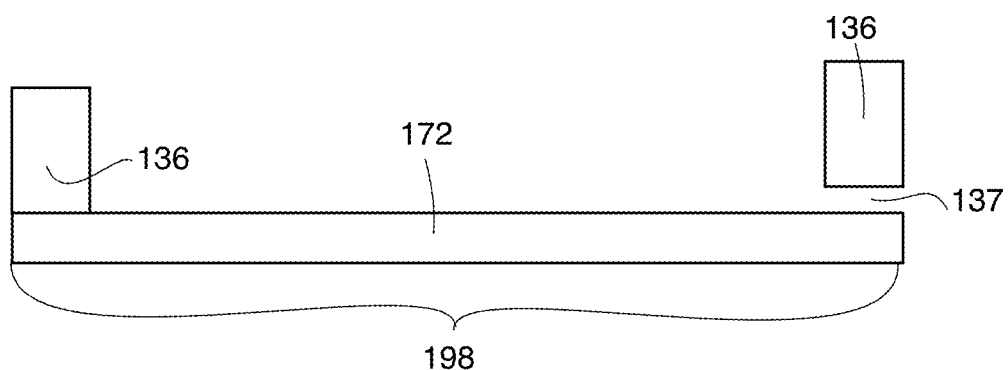

FIGS. 1E and 1F illustrate that the permanent magnets 136 and the magnetoelastic members 172 may be spaced from each other by one or more gaps 137. If tension or compression needs to be transmitted through the gap(s) when the gaps need to be filled with a suitable material such as a high stiffness epoxy adhesive.

Figure 1G:
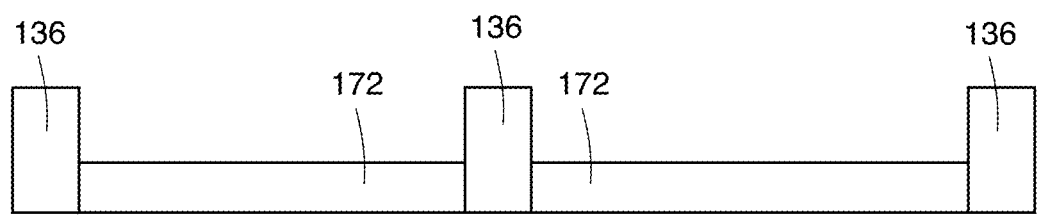
FIG. 1G illustrates yet another embodiment of a magnetoelastic member and permanent magnets to be incorporated as part of a magnetic transmitter.

FIG. 1G is similar to the embodiment of a composite beam element 198 of FIGS. 1A and 1B, but here the permanent magnets 136 and the magnetoelastic member(s) 172 have differing aspect ratios.

Figure 2:
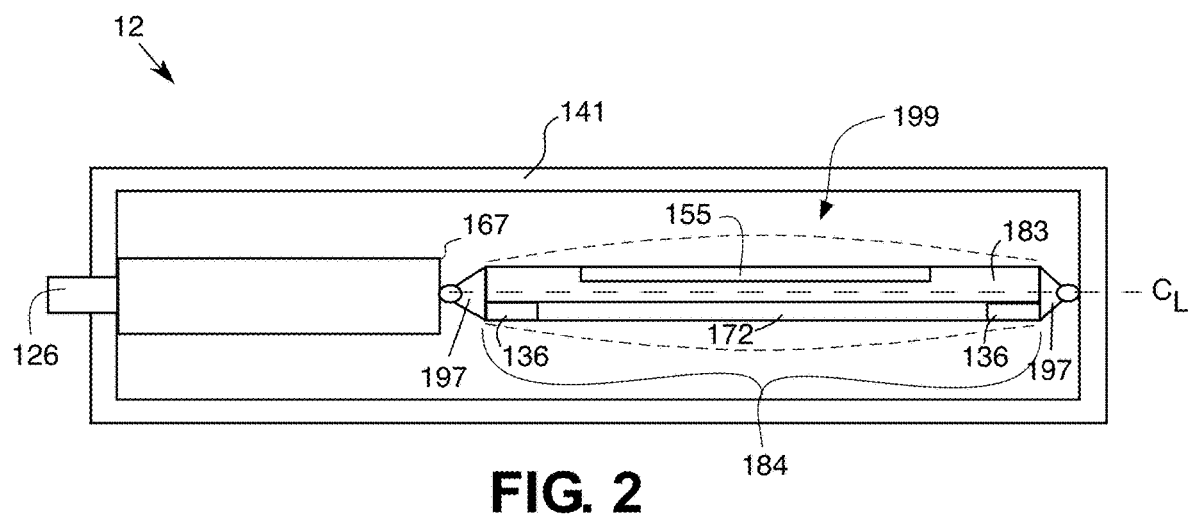
FIG. 2 illustrates a transmitter according to a further embodiment of this presentation.

FIG. 2 illustrates a bending based, magnetic transmitter 12, according to another embodiment of a magnetic transmitter 12 disclosed herein. This is different than the axially excited magnetic transmitter 12 embodiment of FIG. 1. The transmitter 12 of this embodiment has a more complex composite beam element 199 (more complex compared to the beam 198 embodiment of FIG. 1) in that includes a magnetically biased magnetoelastic element 172 assembled as one portion of the composite beam element 199, the composite beam element 199 further including a passive elastic core 183 and a piezoelectric actuator 155 and permanent magnetics 136. The elastic core 183 is preferably a material with desirable mechanical parameters for resonance such as a metal or ceramic. Due to the alternating magnetic fields, materials with limited or zero magnetic induction, and low electrical conductivity are preferred to minimize losses associated with eddy current effects in core 183. This material of core 183 also ideally has a high shear modulus and low elastic losses. In a preferred embodiment, the magnetoelastic element 172, the passive elastic core 183, and the piezoelectric actuator 155 are assembled in, or as, a stack (laminated and/or bonded together (so that they work in tension) a single unit. The ends of the composite beam element 199 may comprise an end fixture 197 to create a desired constraint simulating a pivot or a built-in condition depending on a desired frequency response. An optional end load actuator 167 can be attached or connected to one end of the composite beam element 199, wherein the composite beam element 199 and the end load actuator 167 are preferably disposed inside containment frame 141, and wherein the end load actuator 167 is configured to apply end loads on the composite beam element 199. The end load applied by the end load actuator 167 can vary the natural frequency of the composite beam element 199 of resonator 184 and hence, can vary the frequency of the FM modulation applied to the end load actuator 167 of the magnetic transmitter 12. This is because when the composite beam element 199 of resonator 184 is in an axial stress state (e.g. tension, compression), its natural frequency in bending is shifted. The composite beam element 199 of resonator 184 can be driven at resonance or at a subresonance (below resonance) by varying the axial stress state by the piezoelectric actuator 155 associated with the composite beam element 198. In a preferred embodiment, the composite beam element 198 of resonator 184 is a laminated structure, wherein the magnetoelastic element 172, and permanent magnets 136 are disposed on one side of the passive elastic core 183, and the piezoelectric actuator 155 is preferably disposed on an opposing side of the passive elastic core 183 and all are preferably firmly fixed together. A mechanical preload assembly 126 can be incorporated to provide mechanical stress to the composite beam element 199 and to aid in the transduction of force from the end load actuator 167 to the composite beam element 199. The end load actuator 167 and frame 141 may be omitted if the resonator 184 of FIG. 2 only need to generate constant frequency (or CW) magnetic waves. Of course, CW magnetic waves can carry information by ON-OFF encoding the constant frequency (or CW) magnetic waves.

When the composite beam element 199 bends (see the dashed lines in FIG. 2), one side of the magnetoelastic member 172 is in a state of compression (and therefore has a first permeability), and one side of the magnetoelastic member 172 is in a state of tension (and therefore has a second permeability). Preferably, at any point in time during operation, a majority or the entirety of the material in the magnetoelastic member 172 is in a single stress state so that the majority or the entirety of the material in the magnetoelastic member 172 is in a single magnetic permeability state at a single instant in time; this results in a larger change in the magnetic field external to the transmitter than would occur otherwise if the piezoelectric actuator 155 were not disposed at a side of the composite beam element 199 and on the centerline CL of the centerline composite beam element 199, for example, during operation. By disposing the piezoelectric actuator 155 spaced from the centerline composite beam element 199 ensures that bending thereof will occur. To ensure that a majority or the entirety of the material in the magnetoelastic member 172 is in a single stress state at any point in time during operation, the passive elastic core 183 spaces it from the center line axis CL of the composite beam element 199. A thickness of the passive elastic core can be increased to increase the distance between the magnetoelastic member 172 and a neutral bending axis at the centerline CL, thereby increasing the amount of the material in the magnetoelastic member 172 in a single stress state at any point in time during operation.

Figure 3A:
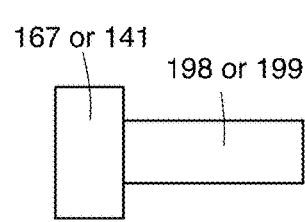
FIGS. 3A-3C illustrate the possible use of an end fixture at the distal ends of a composite beam element.
Figure 3B:
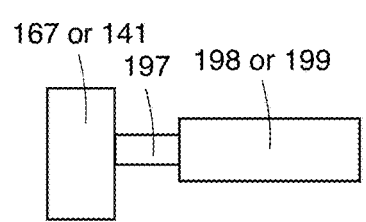
Figure 3C:
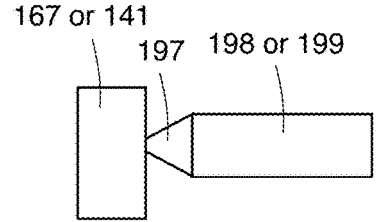

The embodiment of FIG. 2 depicts an optional end fixture 197 at the distal ends of the composite beam element 199. FIG. 3A illustrates an embodiment of a connection at the distal ends of the composite beam element 198 or 199 without an optional end fixture 197, while FIGS. 3B and 3C depict a notched end fixture 197 and a tapered end fixture 197, respectively. These end fixtures 197 can be used to alter the vibratory mode shape of the composite beam element 198 or 199. The dashed lines of FIG. 2 show a first vibratory mode. Higher vibratory modes may be used with each of the embodiments of a magnetic transmitter 14 disclosed herein if desired.

In the embodiment of FIG. 2, the actuator 155 preferably applies a time-varying stress to the passive elastic core 183 so that the composite beam element 199 oscillates at a first frequency. The end load actuator 167 applies an end load to the composite beam element 199, thereby changing the shape of the composite beam element 199 to shift its oscillation frequency. Then, the driving frequency at which the actuator 155 drives the passive elastic core 183 can be shifted to match the shifted oscillation frequency of the composite beam element 199 so that the oscillation amplitude of the composite beam element 198 is increased and/or maximized. The end load actuator 167 preferably applies an end load to the composite beam element 199 at a second frequency, wherein the first frequency is different from the second frequency, and wherein the first frequency is preferably larger than the second frequency. The first frequency is preferably equal to the resonant frequency of the composite beam element 199 to increase or maximize its oscillation amplitude. Shifting the oscillation frequency of the composite beam element 199 shifts the oscillation frequency of the magnetoelastic element 172, thereby shifting the magnetic field frequency external to the magnetic transmitter 12 of FIG. 2.

Though the end load actuator 167 preferably applies compression to the composite beam element 199, the end load actuator 167 can be configured to apply tension to the composite beam element 199 instead.

Figures 4A, 4B:
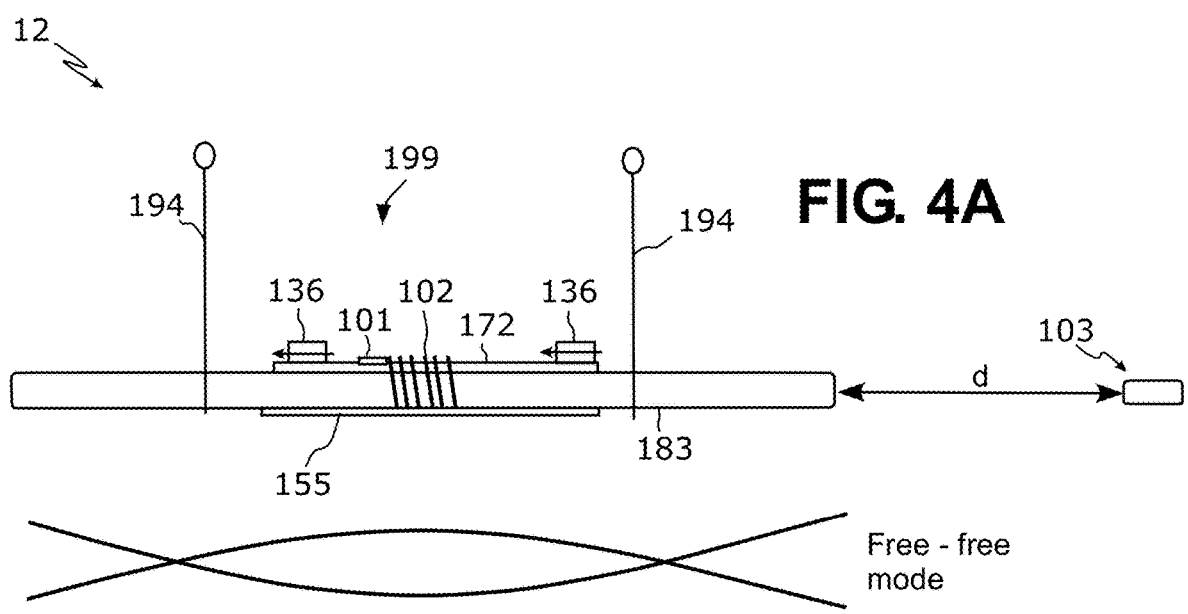

FIG. 4A illustrates yet another embodiment of the technology here disclosed, the magnetic transmitter 12 of this embodiment has a free-free (or unfixed-unfixed) bending magnetoelastic resonator supported by tethers 194. The magnetic transmitter 12 of this embodiment has a composite beam element 199 (which in this embodiment is different than the embodiment of FIG. 2, but more complex that the beam 198 of FIG. 1). The composite beam element 199 of this embodiment includes an elastic beam member 183, a magnetoelastic member 172, and permanent magnets 136 disposed near opposing ends of the magnetoelastic member 172, wherein the magnetoelastic member 172 and the permanent magnets 136 are disposed on a first side of the elastic beam member 183 and a piezoelectric drive element 155 is disposed on a second side of the elastic beam member 183. The elastic beam member 183 may longer than the magnetoelastic member 172, the magnets 136 and the drive member 155 between which it may be sandwiched such that it extends beyond these elements at opposing ends. Alternatively, the magnetoelastic member 172 and the drive member 155 may be embedded in the elastic beam member 183 similar to that shown in the embodiment of FIG. 2. In this respect, tethers 194 are attached preferably at or near the vibratory nodes of the elastic beam member 183 (see FIG. 4B which depict a first vibratory mode of the elastic beam member 183) to support the elastic beam member 183 during its vibratory motion. Permanent magnets 136 which are mounted adjacent or near the opposing ends of the magnetoelastic member 172 provide a magnetic DC bias to the magnetoelastic member 172. This embodiment is similar to the embodiment of FIG. 1F in terms of where the permanent magnets 136 are located vis-a-vis the magnetoelastic member 172. A strain gauge 101 is an optional component that measures the strain induced on the magnetoelastic member 172 and is shown located on the first side of the elastic beam member between the magnets 136 on the magnetoelastic member 172. Coils 102 are another optional component that may be used to measure the magnetic flux through the magnetoelastic member 172. These coils 102 are shown in FIG. 4A wrapping around the central area of the magnetoelastic member 172, the elastic beam member 183, and the piezoelectric drive element 155. A magnetometer 103 is another optional component that may be used to measure the magnetic field remote to transmitter 12.

The elastic beam member 183 is measured in a forced oscillation mode preferably by applying a sinusoidal voltage-frequency chirp signal (a time varying voltage whose frequency is chirped) to the integrated piezoelectric drive element 155. In a preferred embodiment, the piezoelectric drive element 155 is a piezoelectric actuator. During operation, the piezoelectric drive element 155 is driven at a single tone frequency at or near the resonant frequency of the elastic beam member 183. To confirm the changing magnetic dipole moment of the magnetic transmitter 12 caused by the changing modal vibration of the elastic beam member 183, the changing magnetic field can be measured remotely from, or externally to, the magnetic transmitter 12 using the magnetometer 103.

The magnetic transmitter 12 of the disclosed embodiments be operated as a traditional electrical antenna by modulating the drive frequency of the piezoelectric drive element 155 to encode information and produce a frequency modulated (FM) signal transmission, for example. Other modulation schemes as such AM may alternative be utilized. The bandwidth and performance of the antenna is determined by the mechanical quality factor of the elastic beam member 183 which describes the sharpness of the resonance and the loss of energy due to the propagation of the magnetic field and/or the electrical, elastic, magnetic, and piezoelectric energy losses in the structure of the transmitter 16.

Figure 5A:
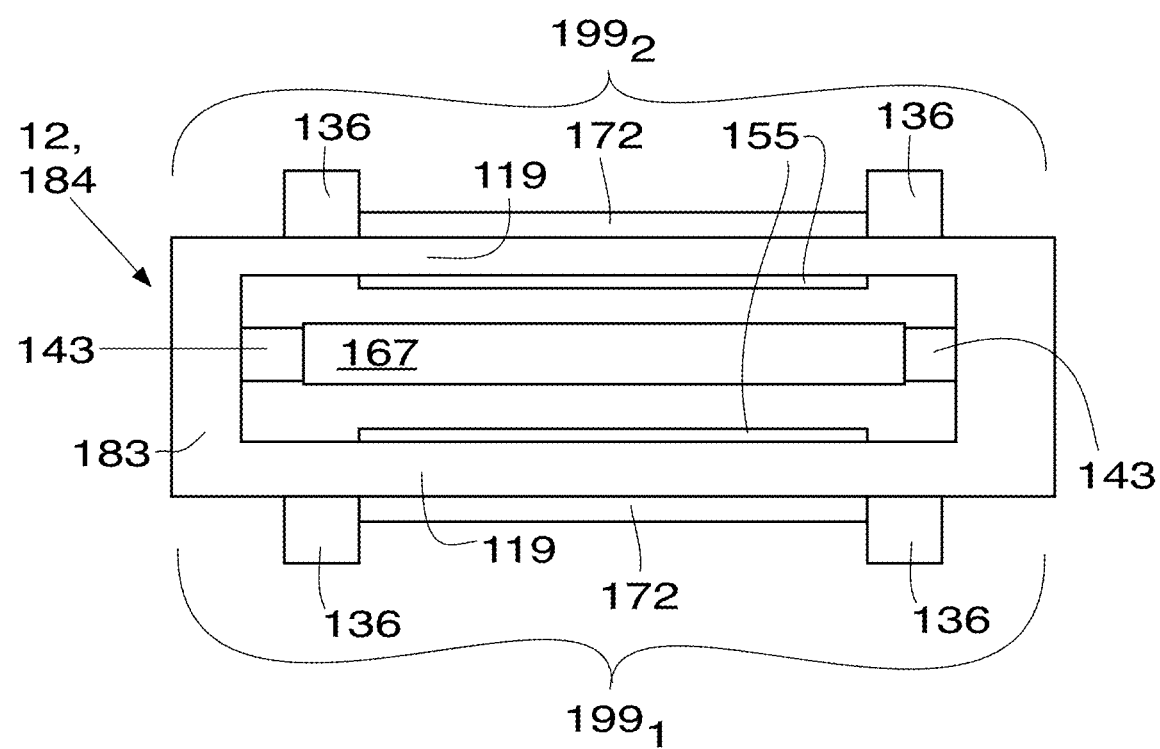
FIGS. 5A and 5B illustrate a transmitter comprising a double-ended tuning fork resonator, according to an embodiment of this presentation.
Figure 5B:
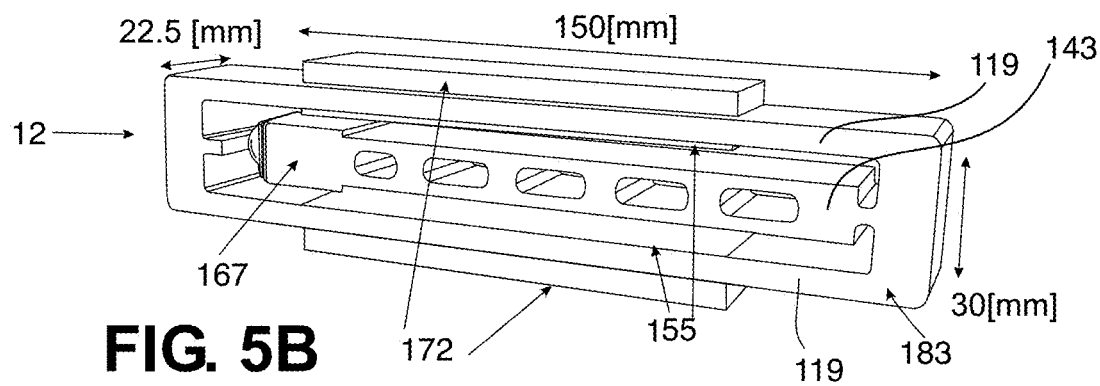

FIGS. 5A and 5B illustrate a double tuning fork embodiment of a magnetic transmitter 12 comprising two parallel composite beam elements 199 (labeled 1991 and 1992 in FIG. 5A) with a common elastic carrier 183. FIG. 5A is a schematic view of this embodiment while FIG. 5B presents a more specific embodiment of the double tuning fork embodiment of a magnetic transmitter 12 (the permanent magnets 136 have been omitted from FIG. 5B for clarity of presentation, but would be included in that design). In FIG. 5B some measurements are provided which of course be altered by those practicing making a double tuning fork embodiment of a magnetic transmitter 12.

The elastic carrier 183 of the double tuning fork embodiment of a magnetic transmitter 12 has two beam bending elements 119, wherein a first side of each beam bending element 119 is attached to a magnetoelastic component 172, and wherein a second side of each beam bending element 119 is attached to a piezoelectric drive element 155. The piezoelectric drive elements 155 are configured to resonate the beam bending elements 119 into mechanical resonance. In a preferred embodiment, the beam bending elements 119 are matched so that they can resonate in opposing directions at the same or similar frequency, preferably at a first vibratory mode (but some embodiments may vibrate at a higher vibratory mode).

The magnetic transmitter 12 of FIG. 5A further includes a generally middle section 143 comprising a piezoelectric actuator 167, wherein the generally middle section 143 is attached to the ends of the elastic carrier 183 via permeant magnets 143 and disposed along a generally central portion thereof. Piezoelectric actuator 167 can apply a load that shifts the resonant frequency of the beam bending elements 119, thereby shifting the resonant frequency of the magnetic transmitter 12 of this embodiment.

All of the dimensions shown in FIG. 5B are merely exemplary and can be altered to control the behavior and performance optimizations of the transmitter 12. For example, the resonant frequency, power usage, tuning bandwidth, etc., of the embodiment of transmitter 12 of FIG. 5B can be adjusted by varying the dimensions shown in FIG. 5B. However, with the dimensions shown in FIG. 5B the transmitter 12 should be able to transmit at a frequency in the kHz band. The piezoelectric actuator 167 in generally middle section 143 acts to apply a tensile stress to the beam bending elements 119 to adjust the resonant frequency of the transmitter 12 of the embodiments of FIGS. 5A-5C, for example. In a first bending mode operation of the transmitter, the maximum displacement is at the center of the beam bending elements 119.

The piezoelectric actuators 167 and 155 for the various embodiments of the disclosed magnetic transmitters 12 is preferably a lead zirconate titanate (PZT) actuator, but other piezoelectric materials may alternatively be utilized. Another type of actuator 167, 172 that may be included is a PMN-PT actuator. Other types of actuators 167, 172, such as quartz, Aluminum Nitride (AlN), or GaN actuators may be preferable for microelectronics systems.

Figure 5C:
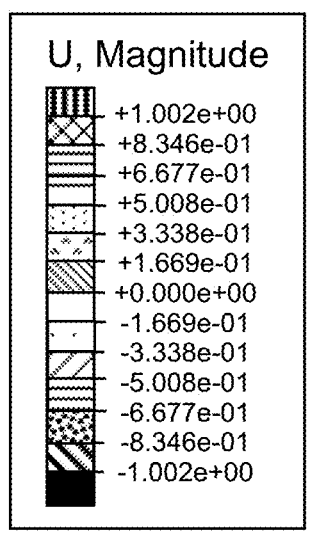
FIG. 5C illustrates a designed displacement field of a transmitter comprising a double-ended tuning fork resonator, according to an embodiment of this presentation.
Figure 5C:
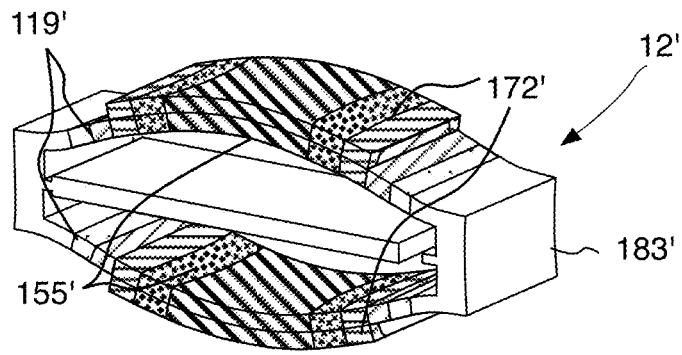

FIG. 5C illustrates a designed displacement field of the first bending mode of a magnetic transmitter 12 of the embodiment of FIG. 5B, according to a further embodiment of the technology herein. For the purposes of brevity, any description of transmitter 12 is incorporated herein insofar as the same is applicable, and the same description need not be repeated. Likewise, elements of transmitter 12 of FIG. 5C corresponding to those in transmitter of FIG. 5A or 5B have corresponding reference numerals appended with apostrophes. Transmitter 12' comprises magnetoelastic components 172', piezoelectric drive elements 155', and an elastic carrier 183' which comprises beam bending elements 119'. FIG. 5C illustrates the first symmetric bending mode of the resonator 12 of FIG. 5B.

Figure 6A:
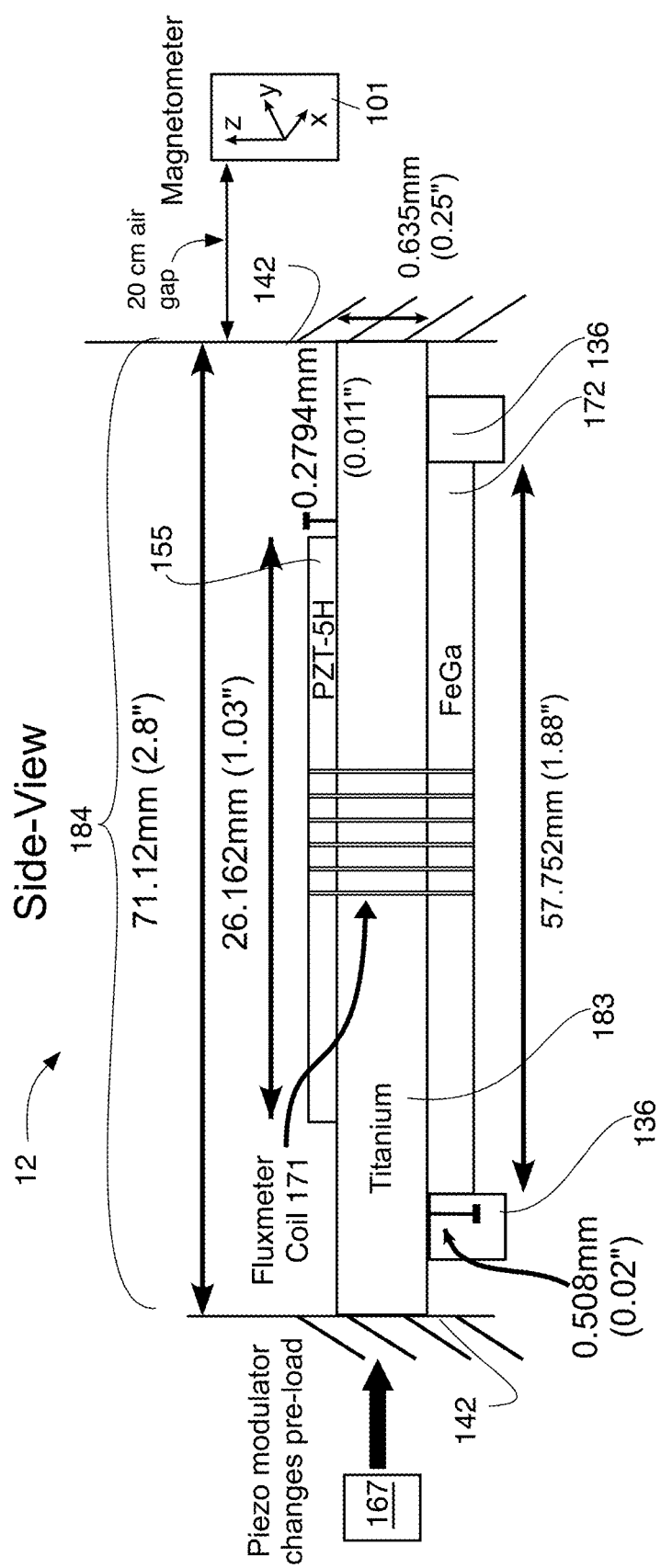
FIG. 6A illustrates a transmitter operated with fixed boundary conditions, according to an embodiment of this presentation.

FIG. 6A illustrates a further embodiment of a magnetic transmitter 12 which is to be operated within fixed mechanical boundary conditions similar to that of the embodiment of FIG. 1, but instead of illustrating an optional containment vessel 141 optional containment edges 142 are shown instead (the containment edges 142 are needed if an end loaded piezoelectric actuator 167 is utilized for FM modulation (or some other modulation scheme) as in the embodiment of FIG. 2). The magnetic transmitter 12 of this embodiment may include an end loaded piezoelectric actuator 167 and a resonator 184 which preferably comprises a laminated structure which includes a magnetoelastic element 172, magnets 136, a piezoelectric element 155, and an elastic carrier 183 which are arranged in a sandwich-like configuration with the elastic carrier 183 extending between the magnetoelastic element 172 and the piezoelectric element 155 and the end load actuator 167, if used in this embodiment, being separate from but communicating with the elastic carrier 183 of resonator 184. The resonator 184 comprises the entire laminated beam structure, while the carrier 183 is part of the resonator which ensures that the mangetoelastic member 172 is positioned off the bending neutral axis of the laminated structure and thus undergoes more uniform stress through the thickness of the mangetoelastic material (i.e. all tension or all compression). The elastic carrier 183 is longer in length than either of the magnetoelastic element 172 and the piezoelectric element 155. The magnetic transmitter 12 of this embodiment is configured to ensure that the stress applied in the magnetoelastic element 172 is uniform when the actuator 155 is driven, as determined by the distance from the neutral bending axis of the resonator 184 The elastic carrier 183 ensures that the magnetoelastic element 172 is positioned off (a distance away from) a neutral bending axis of the resonator 184 (typically the longitudinal centerline of elastic carrier 183 and thus undergoes more uniform stress through the thickness of the material (i.e. all tension or all compression). As long as the magnetoelastic element 172 is some distance away from the neutral bending axis, it will undergo stress that at its peak is nearly uniformly tension or compression. The specific profile variation from the inner to the outer edge is a function of the elastic carrier 183 thickness, magnetoelastic element 172 thickness, and nonlinear material properties of the magnetoelastic element 172. It is a design variable that can be adjusted depending on the requirements for the magnetic transmitter 12 of this embodiment.

The magnetoelastic element 172 is preferably attached or affixed to a first side of the elastic carrier 183 and the piezoelectric element 155 is preferably attached or affixed to a second side of the elastic carrier 183. The piezoelectric element 155 is configured to mechanically drive the resonator 184. If an end load actuator 167 is utilized, then the elastic carrier 183 is preferably disposed between a first and a second end of a frame denoted by containment edges 142, wherein the end load actuator 167 is configured to set the distance between the first and second ends of the frame denoted by containment edges 142, thereby setting a preload or baseline load on the resonator 184 and therefore of the magnetoelastic element 172. Coils 171 are optional and are used to measure the magnetic flux through the magnetoelastic element 172. They are shown wrapping around the middle area of the sandwich of piezoelectric element 155, elastic carrier 183 and magnetoelastic element 172.

The embodiment of a magnetic transmitter 12 illustrated in FIG. 6A (using the sizes of the various elements shown on the drawing) can be operated as an antenna magnetic transmission at 400 Hz, as can be seen in FIGS. 6B and 6C. The effectiveness of the frequency shifting using the end loaded actuator was measured for a fixed-fixed embodiment. FIG.

Figure 6D:
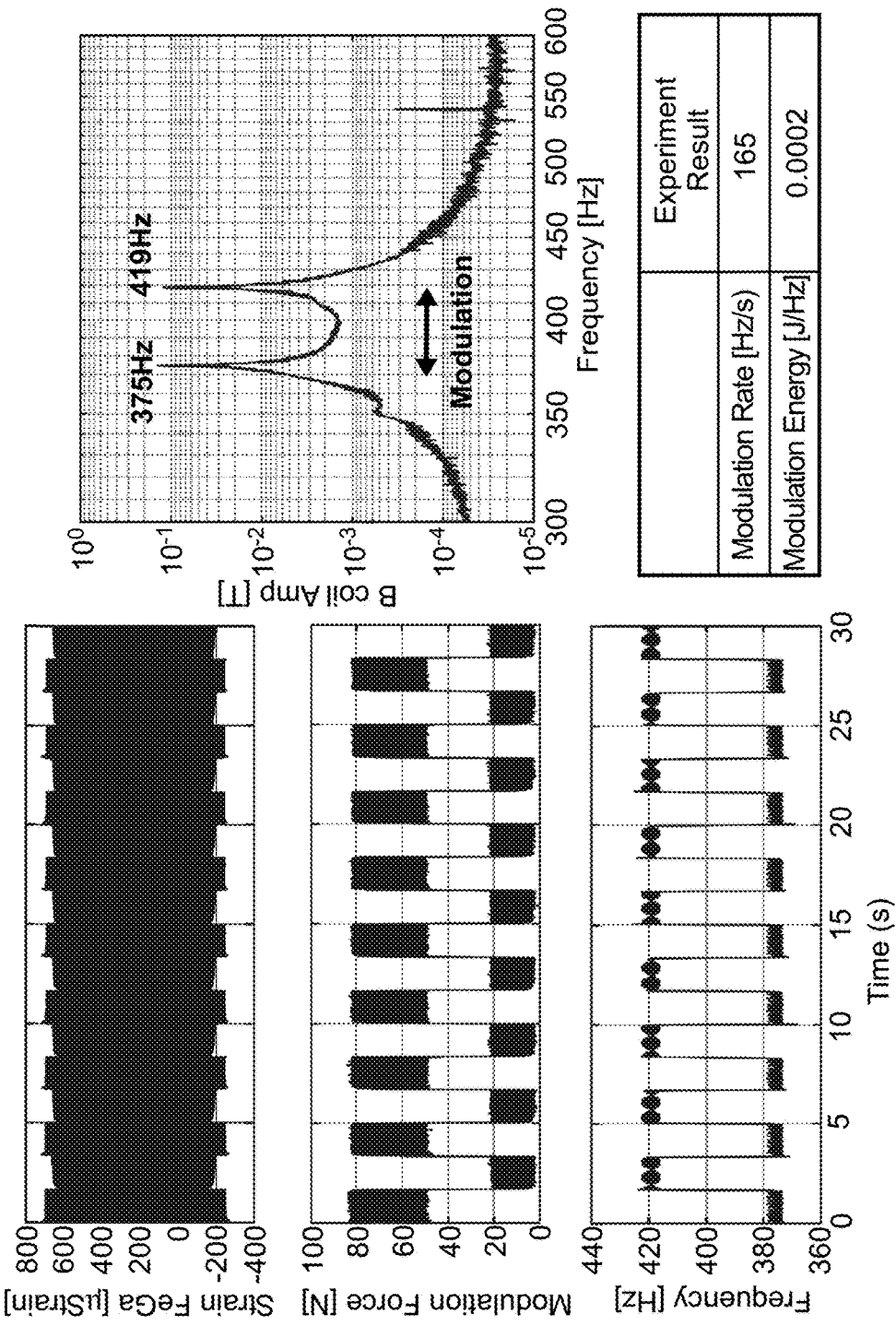
FIG. 6D illustrates an initial square wave testing to shift the resonant frequency a ta rate of 0.3 Hz.

6A illustrates a configuration of such an embodiment, which comprises a magnetoelastic element/beam 172 with an intrinsic natural frequency of ~400 Hz. FIGS. 6B and 6C graphically illustrate the strain in the magnetoelastic element 172, the end load force variation applied to the resonator 184, and the oscillator frequency (which is generally the mechanical resonance of the bending resonator 184 . . . see also FIG. 7A) in time as well as the cumulative Fourier transform of the magnetic flux frequency response measured in air in the vicinity of the transmitter illustrating that the magnetic field frequency had shifted between 375 Hz and 419 Hz. FIG. 6D illustrates an initial square wave testing to shift the resonant frequency at a rate of 0.3 Hz. By loading the resonator 684 in compression, the resonant frequency of the resonator 684 can be lowered by as much as 50 Hz. The magnetic transmitter 12 can utilize frequency shift keying modulation created by end loading the fixed-fixed resonator 184 to induce four different resonant frequencies in the magnetoelastic element 172, thereby producing four corresponding discrete tones. FIGS. 6B and 6C illustrate an exemplary frequency key shifting modulation wherein the message "Hello" is encoded by inducing four strain frequencies in the magnetoelastic element 172. The message "Hello" can be decoded by a magnetometer 101 located 20 cm from the resonator 184. FIG. 6C illustrates the frequency versus time behavior for the encoded signal and the received magnetometer signal showing how the frequency is used to transmit information. Frequency Shift Keying (FSK) is used here to encode the information as a series of 4-bit words.

The end loaded actuator 167 is preferably a piezoelectric actuator providing an end force to the resonator 184. This end load changes the natural frequency of the bending resonator 184. By changing the natural frequency of the resonator 184, information can be encoded in the amptitude domain as in a communication system using conventional antennas. It should be understood that the modulation scheme presented is merely exemplary and many modulation schemes can be implemented. Given the foregoing graphs, the embodiment in FIG. 6A includes dimensions used to build the transmitter and indicates the use of titanium for the elastic carrier 183, FeGa for the magnetoelastic element 172, and preferably PZT-5H for the piezoelectric element 155. These are all exemplary materials and modifications may by utilizing other suitable materials and the indicated sizes of the depicted elements may be modified especially is the natural resonant frequency of the resonator 184 is to be changed.

Figure 7:
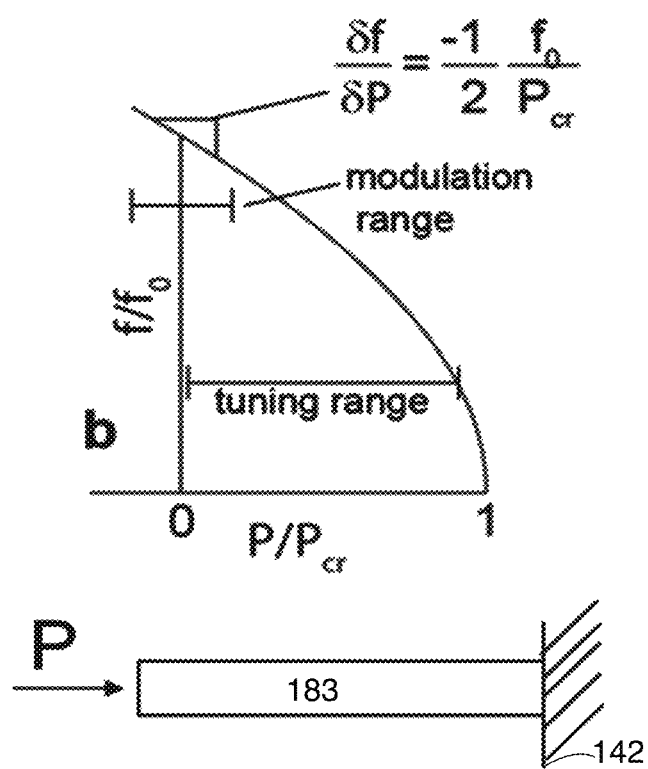
FIG. 7 illustrates a mechanism for shifting the resonator frequency of an elastic beam, according to an embodiment of this presentation.

FIG. 7 illustrates the behavior of the resonant frequency f for an elastic beam 183 under an end load P applied by end loaded actuator 167. The mechanism illustrated in FIG. 7 is used for tuning the resonant frequency of the elastic beam 183 which is preferably a flexural resonator. As can be seen from FIG. 7, near zero load there is a range for $P/P_{cr}$ wherein the slope $\delta f/\delta P$ is essentially linear, defining a linear modulation range. Increasing compression further leads to further decrease in natural frequency and ultimately approaches zero frequency at the critical buckling load, Pcr. The operational frequency range contributes to the communication bandwidth of the antenna. FIG. 7 illustrates that a load P applied to a bending elastic beam 183 will create a change in the natural frequency of the elastic beam 183. Positive load (tension) increases the resonant frequency of the elastic beam 183 while negative load (compression) decreases the natural frequency of the elastic beam 183. $P_{cr}$ is a buckling load at which point the elastic beam 183 buckles into a curved shape and can no longer bear compression. This may define a lower bound for the frequency of the elastic beam.

FIGS. 6B and 6C illustrate properties for an embodiment of a magnetic transmitter 12 having an actuator 167 applying a load with a small oscillation about the zero load point, wherein the load is not near $P_{cr}$. In principal a component can be incorporated that could be tuned to close to zero frequency, thus creating the maximal tuning range.

Figure 7A:
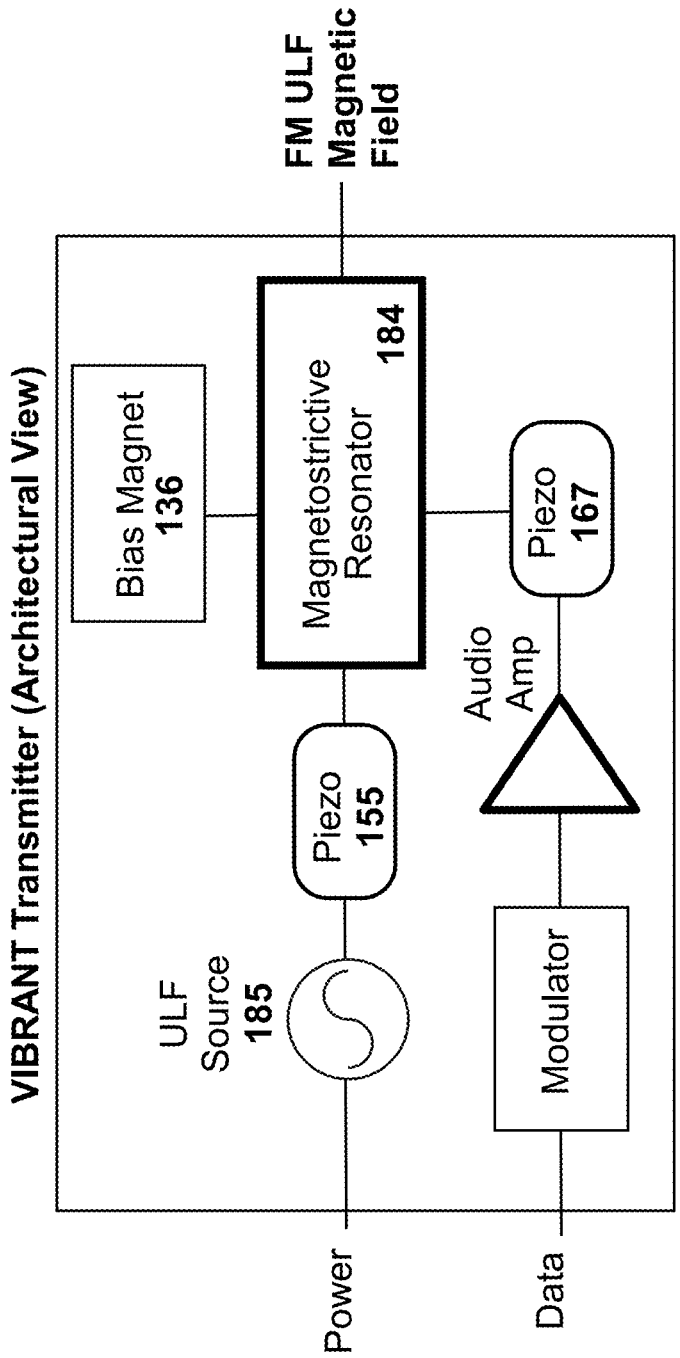
FIG. 7A is a schematic diagram of circuit elements that can drive (i) an actuator disposed on the resonator of the bending mode resonator embodiments and (ii) an actuator that end loads the resonator of the bending mode resonator embodiments.

FIG. 7A is a schematic diagram of circuit elements that can drive the actuators 155 and 167 of the bending mode resonator embodiments of FIGS. 2, 5A-5C, and 6A. The resonator 155 embedded in or attached to core 183 to driven at (or very close to) the natural resonant frequency of the resonator 184 by a Ultra Low Frequency (ULF) source 185. The end loaded actuator is driven by a modulator 186 (with the aid of an audio amplifier 187, if needed). Modulator 186 is preferably a FM modulator, but other types of modulators may in used in some embodiments. In any case, the modulator 186 emits a time-varying single tone for varying the instantaneous frequency of the magnetic wave transmitted by magnetic transmitter 12 in order to encode data on the transmitted magnetic wave as previously discussed with reference to FIGS. 6B and 6C.

Figures 8A, 8B:
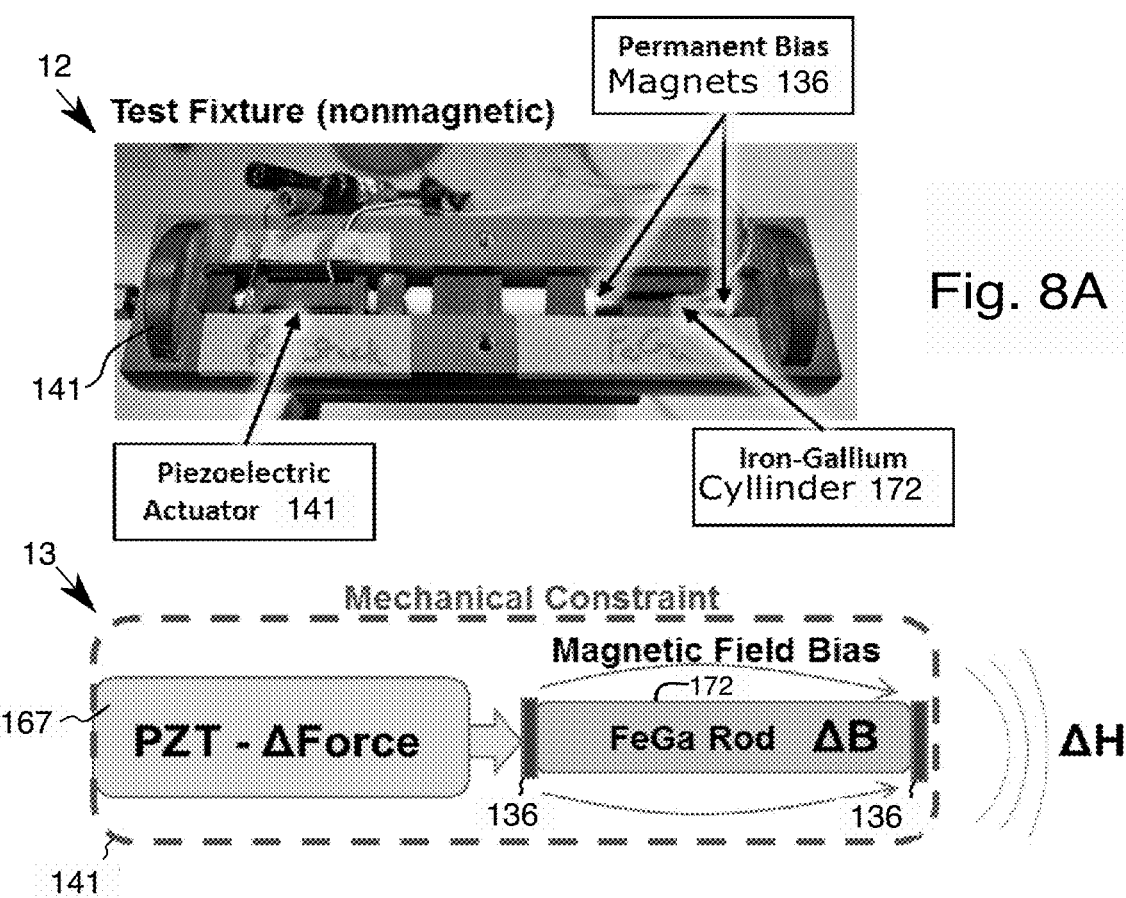
FIG. 8A illustrates a prototype of a transmitter, according to an embodiment of this presentation.
FIG. 8B illustrates a transmitter, according to an embodiment of this presentation.

FIG. 8A illustrates a prototype of a direct drive axial magnetic transmitter 13. This transmitter 13 comprises a frame 141, piezoelectric actuator 167, a magnetoelastic element 172 formed in this embodiment by Galfenol cylinder 172, and permanent bias magnets 136. Transmitter 13 is in a magnetic transmitter having an axial configuration, wherein the magnetoelastic member 172 is axially oriented during operation; preferably, transmitter 12 is configured so that the magnetoelastic member 172 does not bend during operation. The piezoelectric actuator 167 may be operated at 1 Hz.

FIG. 8B illustrates the modulation of a magnetic field in free space using an axial compressive load applied by a piezoelectric stack actuator 167 on a magnetically biased magnetoelastic rod 172. FIG. 8B further illustrates a frame 141 and magnets 136, where it can be seen that a change in the load applied by the piezoelectric stack actuator 167 changes the magnetic permeability of the magnets 136, thereby changing the magnetic field H external to the magnetic transmitter.

Figure 9A:
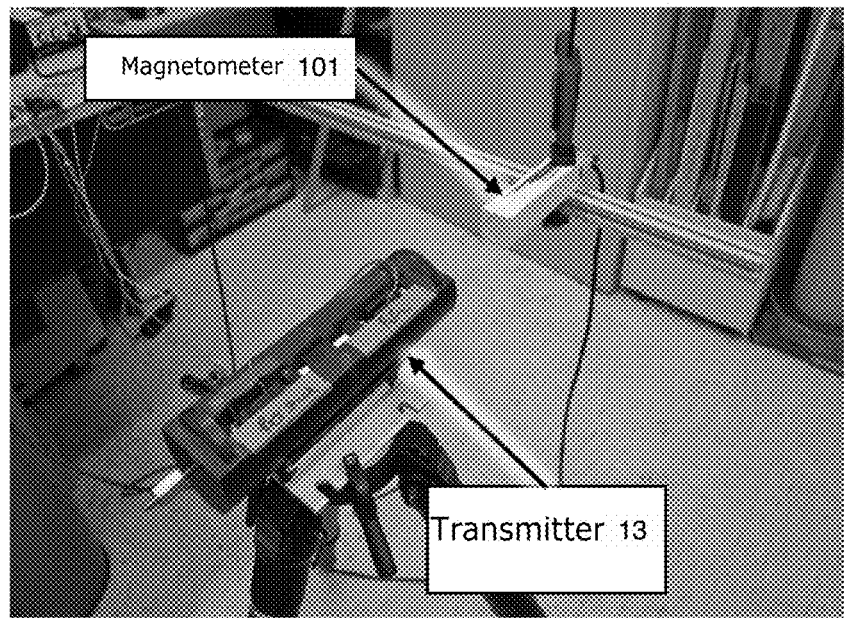
FIG. 9A illustrates a perspective view of the prototype seen in FIG. 8A, and further illustrates a magnetometer, according to an embodiment of this presentation.
Figure 9B:
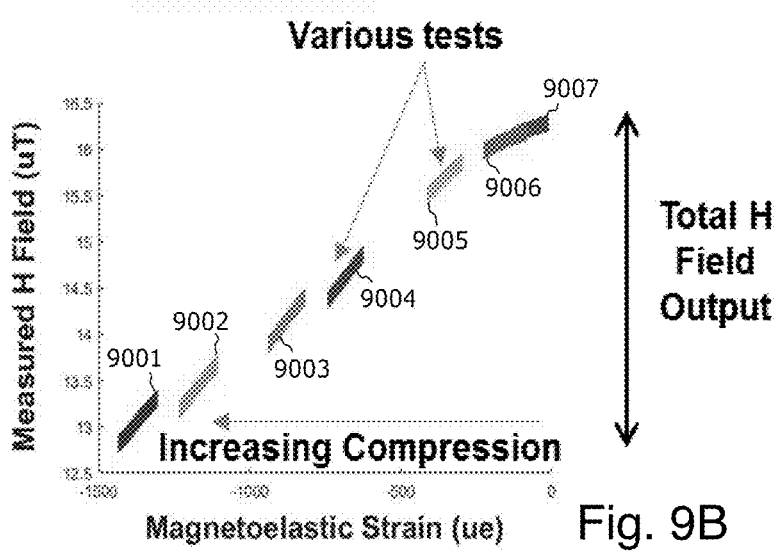
FIG. 9B graphically illustrates measured magnetic field properties of the prototype seen in FIG. 8A, according to an embodiment of this presentation.

FIG. 9A illustrates the transmitter 12 and a magnetometer 101 according to an embodiment of an assembly of the present technology. FIG. 9B illustrates the measured change in a magnetic field resulting from both stress modulation (each of lines 9001-9007 represents a small field change in magnetic field) as well as through preload changes. The total field output could potentially be as large as the total H field output if a larger stroke was employed by actuator 167.

The following description of the embodiments presented herein is contemplated.

The magnetoelastic member 172 may be a ferromagnetic material which exhibits magnetostrictive (or magneto-elastic) characteristics with materials, such as Ni, Terfenol-D, FeGa, FeGaB, MnZn Ferrite, FeCoB, Alfenol, and/or perhaps certain MetGlas® alloys. There are other magnetoelastic materials than those identified above which may be utilized or which may be developed in the future for magnetoelastic material 172. It is to be understood that the discovery of new materials which are highly magnetoelastic (also called magnetostrictive in the art) is ongoing and moreover the discovery of new materials which exhibit very little magnetostrictiveness is also on going. So current (and future) magnetic materials can exhibit little or relatively large amounts of magnetostrictiveness. In this disclosure the term magnetostrictive material(s) or magnetostrictive material is intended to refer to magnetoelastic materials whose magnetostrictive strain (λs) is at least 20 microstrains (50 microstrains is approximately the value of Ni).

Those skilled in the art will understand that the placement of the one or more permanent magnets with respect to the magnetoelastic member can vary depending upon a desired magnetization state of the magnetoelastic member. In at least one embodiment, the permanent magnets are adjacent to the magnetoelastic member so that the magnetoelastic member is magnetized. In at least one embodiment, the magnetoelastic member is disposed along a magnetic moment of the permanent magnets. In at least one embodiment, the magnetoelastic member is elongate and has a major axis, wherein the major axis is parallel to a magnetic moment of the permanent magnets.

Those skilled in the art will understand that the one or more permanent magnets can be replaced by, or used in combination with, one or more electromagnets configured to induce magnetization within the magnetoelastic member.

A "permanent magnet" as used in this document preferably means "a magnet that retains its magnetism in the absence of an inducing magnetic field and electric current."

The containment vessel 141 can be a frame that is preferably rigid, but it need not necessarily be a vessel, but rather only needs to function as a clamp.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this presentation with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this presentation is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A magnetic transmitting antenna comprising:
a composite beam member having a first end and a second end, wherein the composite beam member comprises:
an elastic member;
a magnetoelastic member disposed on a first surface of the elastic member;
a magnet disposed adjacent to the magnetoelastic member such that magnetization is induced in the magnetoelastic member; and
an actuator disposed on a second surface of the elastic member, wherein the actuator is configured to apply stress to the elastic member thereby applying a bending stress thereto for changing the magnetic permeability of the magnetoelastic member, which it turns, changes an external magnetic field.

2. The transmitter of claim 1, wherein the magnetoelastic member is disposed along a magnetic moment of the magnet.

3. The transmitter of claim 1, wherein the first actuator is configured to drive the composite beam member into mechanical resonance.

4. The transmitter of claim 3, wherein a second actuator applies an axial stress along a major axis of the composite beam member, the second actuator comprising a piezoelectric actuator that is driven, in use, either directly or indirectly, by a modulator.

5. The transmitter of claim 4, wherein the piezoelectric actuator of the second actuator is one of a piezoelectric block actuator and a piezoelectric stack actuator.

6. The transmitter of claim 4, wherein the first mentioned actuator is driven, in use, either directly or indirectly, by a ULF source at a frequency at or very close to a natural resonant frequency of the composite beam member.

7. The transmitter of claim 3, wherein the magnet is at least two magnets oriented to have generally parallel magnetic moments and wherein the magnetoelastic member is disposed between a first and a second magnet of the at least two magnets.

8. The transmitter of claim 7, wherein the magnetoelastic member is elongated and wherein a major axis of the elongated magnetoelastic member is disposed generally parallel to the magnetic moments of the at least two magnets.

9. The transmitter of claim 7, wherein the second actuator is configured to change a vibratory frequency of the composite beam member thereby changing a frequency of the external magnetic field.

10. The transmitter of claim 1, wherein the first and second ends of the composite beam member are tapered.

11. The transmitter of claim 1, further comprising a mechanical preload for applying a baseline mechanical stress to the composite beam member.

12. The transmitter of claim 1, wherein the stress applied by the second actuator has an associated load, wherein a frame is provided as a return path for said load.

13. A transmitter comprising:
a housing;
tethers attached to the housing;
a composite beam member, wherein the composite beam member comprises:
an elastic member attached to the tethers;
a magnetoelastic member attached to a first surface of the elastic member;
a magnet disposed adjacent to the magnetoelastic member such that magnetization is induced in the magnetoelastic member; and an actuator attached to a second surface of the elastic member, wherein the actuator is configured to apply stress to the elastic member thereby applying stress to and changing the magnetic permeability of the magnetoelastic member to change an external magnetic field.

14. The transmitter of claim 13, wherein the composite beam member has ends which are not fixed.

15. The transmitter of claim 13, wherein the composite beam member has nodes of vibration during operation, wherein the tethers are attached at the nodes of said vibration.

16. A transmitter comprising:
one or more magnetoelastic members;
a magnet disposed adjacent to the one or more magnetoelastic members such that magnetization is induced in the one or more magnetoelastic members;
one or more a first actuators;
a resonator, the resonator comprising one or more bending members having first and second ends, wherein each of said one or more bending members has first and second surfaces, wherein each first surface is attached to at least one of the one or more magnetoelastic members, wherein each second surface is attached to one of said one or more first actuators, and wherein the one or more first actuators are configured to apply stress to the one or more bending members thereby applying stress to and changing the magnetic permeability of the one or more magnetoelastic members to change an external magnetic field.

17. The transmitter of claim 16 further including a core of column of material and a second actuator, wherein a first end of the core or column is disposed against the first ends of the one or more bending members for applying, in use, an axial stress to said one or more bending members thereby changing the magnetic permeability of one or more magnetoelastic members to thereby change the external magnetic field.

18. A transmitter comprising:
an elastic member;
a magnetoelastic member attached to or embedded in a first side of the elastic member;
a magnet disposed adjacent to the magnetoelastic member for inducing magnetization in the magnetoelastic member; and
a first actuator attached to or embedded in a second side of the elastic member, wherein the first actuator is configured to apply a bending stress to the elastic member thereby applying stress to and changing the magnetic permeability of the magnetoelastic member to change an external magnetic field.

19. The transmitter of claim 18, further comprising:
a second actuator coupled to the elastic member; and
a frame, wherein a first end of the frame is coupled to a first end of the elastic member, and wherein a second end of the frame is coupled to the second actuator; and
wherein the second actuator is configured to apply an axial stress to the elastic member thereby applying stress to and changing the magnetic permeability of the magnetoelastic member to change the external magnetic field.

20. A transmitter comprising:
a magnetoelastic member;
a magnet adjacent to the magnetoelastic member for inducing magnetization in the magnetoelastic member; and
a mechanical driver configured to apply an axial mechanical stress to the magnetoelastic material thereby changing the magnetic permeability of the magnetoelastic material to change a magnetic field external to the transmitter.

21. The transmitter of claim 20, wherein the magnetoelastic member is an elongate magnetoelastic member and wherein a direction of the axial mechanical stress is collinear with a major axis of the elongate magnetoelastic member.

22. The transmitter of claim 21, further comprising a frame, wherein a first end of the frame is coupled to a first end of the magnetoelastic member, and wherein a second end of the frame is coupled to the mechanical driver.

23. The transmitter of claim 22, wherein the mechanical driver is configured to compress the magnetoelastic member.

24. The transmitter of claim 23, wherein the stress applied by the mechanical driver has an associated load, and wherein the frame provides a return path for the load.

25. A method of transmitting data comprising:
providing at least one elongate magnetoelastic member;
inducing a magnetic field in said at least one elongate magnetoelastic member;
subjecting said at least one elongate magnetoelastic member to an axially applied stress, the axially applied stress being modulated in intensity according to data to be transmitted.

26. The method of claim 25 further including attaching or embedding said at least one elongate magnetoelastic member in an elastic core and attaching or embedding said at least one mechanical actuator in said elastic core, said elastic core, said at least one elongate magnetoelastic member and said at least one mechanical actuator having a resonant frequency.

27. The method of claim 26 further including applying an AC signal to said at least one mechanical actuator at a frequency near the resonant frequency of the elastic core, the elastic core, and the at least one elongate magnetoelastic member.

28. The method of claim 27 wherein said AC signal has a frequency in the ULF band of 300 Hz to 3 kHz.

29. The method of claim 28 a frequency of the axially applied stress is applied by at least a second mechanical actuator.

30. The method of claim 29 wherein the at least a second mechanical actuator is driven in response to a modulator, the modulator in turn being responsive to the data to be transmitted.

31. An apparatus for transmitting data comprising:
at least one elongate magnetoelastic member;
means inducing a magnetic field in said at least one elongate magnetoelastic member;
means subjecting said at least one elongate magnetoelastic member to an axially applied stress, the axially applied stress being modulated in intensity according to data to be transmitted.

32. The apparatus of claim 31 wherein said at least one elongate magnetoelastic member is attached or embedded in an elastic core and said at least one mechanical actuator is attached or embedded in said elastic core, said elastic core, said at least one elongate magnetoelastic member and said at least one mechanical actuator having a resonant frequency.

33. The apparatus of claim 32 further including means applying an AC signal to said at least one mechanical actuator at a frequency near the resonant frequency of the elastic core, the elastic core, and the at least one elongate magnetoelastic member.

34. The apparatus of claim 33 wherein said AC signal has a frequency in the ULF band of 300 Hz to 3 kHz.

35. The apparatus of claim 32 wherein said means subjecting said at least one elongate magnetoelastic member to an axially applied stress includes at least a second mechanical actuator.

36. The apparatus of claim 35 wherein the at least a second mechanical actuator is driven in response to a modulator, the modulator in turn being responsive to the data to be transmitted.

\* \* \* \* \*